United States Patent
Li et al.

(10) Patent No.: US 12,165,032 B2
(45) Date of Patent: Dec. 10, 2024

(54) NEURAL NETWORKS WITH AREA ATTENTION

(71) Applicant: Google LLC, Mountain View, CA (US)

(72) Inventors: Yang Li, Palo Alto, CA (US); Lukasz Mieczyslaw Kaiser, Mountain View, CA (US); Samuel Bengio, Los Altos, CA (US); Si Si, San Jose, CA (US)

(73) Assignee: Google LLC, Mountain View, CA (US)

( * ) Notice: Subject to any disclaimer, the term of this patent is extended or adjusted under 35 U.S.C. 154(b) by 1024 days.

(21) Appl. No.: 16/586,813

(22) Filed: Sep. 27, 2019

(65) Prior Publication Data

US 2020/0104681 A1  Apr. 2, 2020

Related U.S. Application Data

(60) Provisional application No. 62/737,913, filed on Sep. 27, 2018.

(51) Int. Cl.
| | | |
|---|---|---|
| *G06N 3/045* | (2023.01) | |
| *G06F 16/903* | (2019.01) | |
| *G06N 3/10* | (2006.01) | |
| *G06F 16/00* | (2019.01) | |
| *G06F 40/00* | (2020.01) | |

(52) U.S. Cl.
CPC .......... *G06N 3/045* (2023.01); *G06F 16/903* (2019.01); *G06N 3/10* (2013.01); *G06F 16/00* (2019.01); *G06F 40/00* (2020.01)

(58) Field of Classification Search
CPC .......... G06N 3/0454; G06N 3/10; G06N 3/08
See application file for complete search history.

(56) References Cited

U.S. PATENT DOCUMENTS

| | | | |
|---|---|---|---|
| 2019/0005090 A1* | 1/2019 | Zhang | .............. G06F 40/30 |
| 2019/0130273 A1* | 5/2019 | Keskar | .............. G06N 3/0454 |
| 2019/0251952 A1* | 8/2019 | Arik | .............. G10L 13/027 |

OTHER PUBLICATIONS

Miller A, Fisch A, Dodge J, Karimi AH, Bordes A, Weston J. Key-value memory networks for directly reading documents. arXiv preprint arXiv: 1606.03126. Jun. 9, 2016. (Year: 2016).*
Kaiser Ł, Nachum O, Roy A, Bengio S. Learning to remember rare events. arXiv preprint arXiv:1703.03129. Mar. 9, 2017. (Year: 2017).*
Sukhbaatar S, Weston J, Fergus R. End-to-end memory networks. Advances in neural information processing systems. 2015;28. (Year: 2015).*
Tan Z, Wang M, Xie J, Chen Y, Shi X. Deep semantic role labeling with self-attention. InProceedings of the AAAI conference on artificial intelligence Apr. 26, 2018 (vol. 32, No. 1). (Year: 2018).*
Yang B, Tu Z, Wong DF, Meng F, Chao LS, Zhang T. Modeling localness for self-attention networks. arXiv preprint arXiv: 1810. 10182. Oct. 24, 2018. (Year: 2018).*

(Continued)

*Primary Examiner* — Oluwatosin Alabi
(74) *Attorney, Agent, or Firm* — Fish & Richardson P.C.

(57) ABSTRACT

Methods, systems, and apparatus, including computer programs encoded on computer storage media, for implementing an area attention layer in a neural network system. The area attention layer area implements a way for a neural network model to attend to areas in the memory, where each area contains a group of items that are structurally adjacent.

20 Claims, 4 Drawing Sheets

(56) References Cited

OTHER PUBLICATIONS

Povey D, Hadian H, Ghahremani P, Li K, Khudanpur S. A time-restricted self-attention layer for ASR. In2018 IEEE International Conference on Acoustics, Speech and Signal Processing (ICASSP) Apr. 15, 2018 (pp. 5874-5878). IEEE. (Year: 2018).*

Jain AK, Agarwalla A, Agrawal KK, Mitra P. Recurrent Memory Addressing for Describing Videos. InCVPR Workshops Jul. 1, 2017 (vol. 7, pp. 1-8). (Year: 2017).*

Zhou X, Li L, Dong D, Liu Y, Chen Y, Zhao WX, Yu D, Wu H. Multi-turn response selection for chatbots with deep attention matching network. InProceedings of the 56th Annual Meeting of the Association for Computational Linguistics (vol. 1: Long Papers) Jul. 2018 (pp. 1118-1127). (Year: 2018).*

Li Y, Kaiser L, Bengio S, Si S. Area attention. InInternational Conference on Machine Learning May 24, 2019 (pp. 3846-3855). PMLR. (Year: 2019).*

Anderson et al., "Bottom-Up and Top-Down Attention for Image Captioning and VQA," https://arxiv.org/abs/1707.07998v1, Jul. 2017, 13 pages.

Bahdanau et al., "Neural machine translation by jointly learning to align and translate," arXiv, May 2016, 15 pages.

Britz et al., "Massive Exploration of Neural Machine Translation Architectures," https://arxiv.org/abs/1703.03906v1, Mar. 2017, 9 pages.

Dean et al., "Large scale distributed deep networks," Advances in neural information processing systems, Dec. 2012, 9 pages.

Girshick, "Fast R-CNN," https://arxiv.org/abs/1504.08083v1, Apr. 2015, 9 pages.

He et al., "Deep residual learning for image recognition," arXiv, Dec. 2015, 12 pages.

Hochreiter et al., "Long short-term memory," Neural computation, Nov. 1997, 32 pages.

Kalchbrenner et al., "Neural Machine Translation in Linear Time," https://arxiv.org/abs/1610.10099v2, Mar. 2017, 9 pages.

Kim et al., "Structured Attention Networks," https://arxiv.org/abs/1702.00887v1, Feb. 2017, 21 pages.

Kitaev et al., "Constituency Parsing with a Self-Attentive Encoder," https://arxiv.org/abs/1805.01052, May 2018, 12 pages.

Lee et al., "End-to-end Neural Coreference Resolution," https://arxiv.org/abs/1707.07045v1, Jul. 2017, 10 pages.

Lee et al., "Fully character-level neural machine translation without explicit segmentation," arXiv, Jun. 2017, 13 pages.

Lin et al., "Microsoft COCO: common objects in context," arXiv, Feb. 2015, 15 pages.

Lin et al., "Microsoft COCO: Common Objects in Context," https://arxiv.org/abs/1405.0312v1, May 2014, 14 pages.

Lin et al., "Orange: A method for evaluating automatic evaluation metrics for machine translation," Proceedings of the 20th international conference on Computational Linguistics, Aug. 2004, 7 pages.

Lu et al., "Neural Baby Talk," https://arxiv.org/abs/1803.09845, Mar. 2018, 12 pages.

Luong et al., "Effective approaches to attention-based neural machine translation," arXiv, Sep. 2015, 11 pages.

Niculae et al., "A Regularized Framework for Sparse and Structured Neural Attention," 31st Conference on Neural Information Processing Systems (NIPS 2017), Dec. 2017, 11 pages.

Pedersoli et al., "Areas of Attention for Image Captioning," https://arxiv.org/abs/1612.01033v1, Dec. 2016, 10 pages.

Rei et al., "Zero-shot Sequence Labeling: Transferring Knowledge from Sentences to Tokens," Proceedings of the 2018 Conference of the North American Chapter of the Association for Computational Linguistics: Human Language Technologies, Jun. 2018, 1:293-302.

Sharma et al., "Conceptual captions: A cleaned, hypernymed, image alt-text dataset for automatic image captioning," Proceedings of the 56th Annual Meeting of the Association for Computational Linguistics, Jul. 2018, 10 pages.

Shen et al., "Neural Attention Models for Sequence Classification: Analysis and Application to Key Term Extraction and Dialogue Act Detection," https://arxiv.org/abs/1604.00077, Mar. 2016, 5 pages.

Stern et al., "A Minimal Span-Based Neural Constituency Parser," https://arxiv.org/abs/1705.03919, May 2017, 10 pages.

van Vliet, "Robust Local Max-Min Filters by Normalized Power-Weighted Filtering," Proceedings of the 17th International Conference on Pattern Recognition (ICPR'04), Aug. 2004, 4 pages.

Vaswani et al., "Attention is all you need," arXiv, Dec. 2017, 15 pages.

Vedantam et al., "Cider: Consensus-based image description evaluation," Proceedings of the IEEE conference on computer vision and pattern recognition, Jun. 2015, 10 pages.

Viola et al., "Rapid object detection using a boosted cascade of simple features," CVPR, Dec. 2001, 11 pages.

Wang et al., "Graph-based Dependency Parsing with Bidirectional LSTM," Proceedings of the 54th Annual Meeting of the Association for Computational Linguistics, retrieved from URL <https://www.aclweb.org/anthology/P16-1218.pdf>, Aug. 2016, 2306-2315.

Wu et al., "Google's neural machine translation system: Bridging the gap between human and machine translation," arXiv, Oct. 2016, 23 pages.

Xu et al., "Show, attend and tell: Neural image caption generation with visual attention," arXiv, Apr. 2016, 22 pages.

You et al, "Image Captioning with Semantic Attention," https://arxiv.org/abs/1603.03925, Mar. 2016, 10 pages.

Young et al., "From image descriptions to visual denotations: New similarity metrics for semantic inference over event descriptions," Transactions of the Association for Computational Linguistics 2, Dec. 2014, 12 pages.

Zheng et al., "Learning Multi-attention Convolutional Neural Network for Fine-Grained Image Recognition," 2017 IEEE International Conference on Computer Vision (ICCV), Oct. 2017, 5219-5227.

* cited by examiner

Algorithm 1: Compute the vector sum and the size of each area, for all the qualified rectangular areas on a given grid.

Input: A tensor $G$ in shape of $[H, W, D]$ that represents a grid with height $H$ and width $W$ where each item is a vector of depth $D$.

Output: Sum of vectors of each area, $U$, and height and width of each area, $S_h$ and $S_w$.

Hyperparameter: maximum allowed area width $W_\alpha$ and height $H_\alpha$.

1 Compute horizontal integral image $I_h$ by cumulative sum
2  along horizontal direction over $G$;
3 Compute integral image $I_{hv}$ by cumulative sum along
4  vertical directions over $I_h$;
5 Compute $I$ by padding all-zero vectors to the left and
6  top of $I_{hv}$;
7 for $h = 1, \cdots, H_\alpha$ do
8     for $w = 1, \cdots, W_\alpha$ do
9         $I_1 \leftarrow I[h+1:, w+1:, :]$;
10         $I_2 \leftarrow I[:-h-1, :-w-1, :]$;
11         $I_3 \leftarrow I[h+1:, :-w-1, :]$;
12         $I_4 \leftarrow I[:-h-1, w+1:, :]$;
13         $\bar{U} = I_1 + I_2 - I_3 - I_4$;
14         $\bar{S}_h \leftarrow [h]^{(H-h) \times (W-w)}$; Fill tensor with value $h$ for the height of each area;
15         $\bar{S}_w \leftarrow [w]^{(H-h) \times (W-w)}$; Fill tensor with value $w$ for the width of each area;
16         $S_h \leftarrow [S_h\ \bar{S}_h]$, reshape $\bar{S}_h$ to $[-1, 1]$ and concatenate on the first dimension;
17         $S_w \leftarrow [S_w\ \bar{S}_w]$, reshape $\bar{S}_w$ to $[-1, 1]$ and concatenate on the first dimension;
18         $U \leftarrow [U\ \bar{U}]$, reshape $\bar{U}$ to $[-1, D]$ and concatenate on the first dimension;
19 return $U$, $S_h$ and $S_w$.

FIG. 4

Algorithm 2: Compute the vector mean, standard deviation, and sum as well as the size of each area, for all the qualified rectangular areas on a grid.

Input: A tensor $G$ in shape of $[H, W, D]$ that represents a grid with height $H$ and width $W$ where each item is a vector of depth $D$.

Output: Vector mean $\mu$, standard deviation $\sigma$ and sum $U$ as well as height $S_h$ and width $S_w$ of each area.

1. Acquire $U$, $S_h$ and $S_w$ using Algorithm 1 with input $G$;
2. Acquire $U'$ using Algorithm 1 with input $G \odot G$ where $\odot$ is for element-wise multiplication;
3. $\mu \leftarrow U \oslash S$ where $\oslash$ is for element-wise division;
4. $\mu' \leftarrow U' \oslash S$;
5. $\sigma \leftarrow \sqrt{\mu' - \mu \odot \mu}$;
6. return $\mu$, $\sigma$, $U$, as well as $S_h$ and $S_w$.

FIG. 5

NEURAL NETWORKS WITH AREA ATTENTION

CROSS-REFERENCE TO RELATED APPLICATIONS

This application claims the benefit under 35 U.S.C. § 119(e) of the filing date of U.S. Patent Application No. 62/737,913, for "Neural Networks with Area Attention," which was filed on Sep. 27, 2018, and which is incorporated here by reference.

BACKGROUND

This specification relates to processing inputs using neural networks.

Neural networks are machine learning models that employ one or more layers of nonlinear units to predict an output for a received input. Some neural networks include one or more hidden layers in addition to an output layer. The output of each hidden layer is used as input to another layer in the network, i.e., a hidden layer or an output layer. Each layer of the network generates an output from a received input in accordance with current values of a respective set of parameters.

Attentional mechanisms have been used to boost the accuracy on a variety of deep learning tasks. They allow a model to focus selectively on specific pieces of information; a piece of information can be, for example, a word in a sentence for neural machine translation or a region of pixels in image captioning.

An attentional mechanism typically follows a memory-query paradigm, where the memory M contains a collection of items of information from a source modality, e.g., the embeddings of an image or the hidden states of encoding an input sentence, and the query q comes from a target modality, e.g., the hidden state of a decoder model. In architectures such as Transformer, self-attention involves queries and memory from the same modality for either encoder or decoder. Each item in the memory has a key-value pair, $(k_i, v_i)$, where the key is used to compute the probability $a_i$ regarding how well the query matches the item, as expressed in equation 1.

$$a_i = \frac{\exp(f_{att}(q, k_i))}{\sum_{j=1}^{|M|} \exp(f_{att}(q, k_j))} \quad (1)$$

Typical choices for $f_{att}$ include dot products $qk_i$ and a multilayer perceptron. The output $O_q^M$ from querying the memory M with q is then calculated as the sum of all the values in the memory weighted by their probabilities, as expressed in equation 2, which can be fed to other parts of the model for further calculation.

$$O_q^M = \sum_{i=1}^{|M|} a_i v_i \quad (2)$$

During training, the model learns to attend to specific pieces of information given a query. For example, it can associate a word in the target sentence with a word in the source sentence for translation tasks.

Attention mechanisms are typically designed to focus on a predetermined granularity of individual items in the entire memory, where each item defines the granularity of what the model can attend to. For example, it can be a character for a character-level translation model, a word for a word-level model, a grid cell for an image-based model, or a hidden state in a latent space.

SUMMARY

This specification describes a system implemented as computer programs on one or more computers in one or more locations that generates a machine learning model output from a machine learning model input.

In particular, this specification describes a system that uses a self-attention neural network to generate model output from a model input, with at least one of the self-attention layers in the neural network employing an area attention mechanism.

Generally, at least one of the input and output is a sequence. For example, the output can be a target sequence that includes a respective output at each of multiple positions in an output order, the input can be an input sequence that includes a respective input at each of multiple positions in an input order, or both the input and output can be a sequence, i.e., the system transduces an input sequence into an target sequence.

For example, the system may be a neural machine translation system. That is, if the input sequence is a sequence of words or characters in an original language, e.g., a sentence or phrase, the target sequence may be a translation of the input sequence into a target language, i.e., a sequence of words or characters in the target language that represents the sequence of words in the original language.

As another example, the system may be a speech recognition system. That is, if the input sequence is a sequence of audio data representing a spoken utterance, the target sequence may be a sequence of graphemes, characters, or words that represents the utterance, i.e., is a transcription of the input sequence.

As another example, the system may be a natural language processing system. For example, if the input sequence is a sequence of words in an original language, e.g., a sentence or phrase, the target sequence may be a summary of the input sequence in the original language, i.e., a sequence that has fewer words than the input sequence but that retains the essential meaning of the input sequence. As another example, if the input sequence is a sequence of words that form a question, the target sequence can be a sequence of words that form an answer to the question. As yet another example, if the input sequence is a sequence of words, the target sequence may be a sequence that defines a parse tree, e.g., a dependency parse or a constituency parse, of the input sequence. As yet another example, if the input sequence is a sequence of words, the output of the neural network can be a natural language understanding output, e.g., an output for an entailment task, a paraphrase task, a textual similarity task, a sentiment task, a grammaticality task, and so on.

As another example, the system may be part of a computer-assisted medical diagnosis system. For example, the input sequence can be a sequence of data from an electronic medical record and the output can be a sequence of predicted treatments or a single predicted treatment to be performed after the last input in the input sequence.

As another example, the system may be an image generation system that generates images conditioned on a particular type of input, e.g., a smaller image, an object category, or a natural language text sequence. In these examples, the system may receive the input and then generate the output image as a sequence of color values, i.e., of color channel values for the pixels of the output image, or as a two-dimensional structure of color values.

As another example, the system may be part of an image captioning system. That is, the system can receive an image, e.g., as a sequence of the color values of the image or a 3D tensor, or an embedding of an image, and then generate a sequence of text that captions the image, i.e., that is a natural language description of the image.

As another example, the system may be a system that receives as input one or more video frames. For example, the system can receive as input a sequence of video frames and then predict the next frame, e.g. as a sequence of color values or as a two-dimensional structure of color values. As another example, the system can receive as input a sequence of video frames from a video and then generate a natural language text sequence that describes the video.

As another example, the system may be a system that processes sequences of biological data, e.g., genome sequencing reads.

In particular, the neural network includes one or more area attention layers.

Each area attention layer is configured to, during the processing of each neural network input by the neural network, receive data specifying a memory including a plurality of items and, for each item, a respective key and a respective value.

The area attention layer then determines a plurality of areas within the memory, wherein (i) each area includes one or more items in the memory, and (ii) one or more of the areas include multiple adjacent items in the memory. The area attention layer determines, for each of the plurality of areas, a respective area key and a respective area value from at least the keys and values of the items in the area.

The area attention layer then receives an attention query and applies an attention mechanism between the attention query and the area keys for each area to generate a respective attention weight for each area.

The area attention layer then generates an area attention layer output by combining the area values for each area in accordance with the attention weights.

An area attention layer can be used in a neural network in place of some or all of the conventional attention layers in the neural network.

For example, some neural networks include an encoder neural network, a decoder neural network, and an attention layer. The encoder neural network generates a respective encoded representation for each of multiple portions of the neural network input and provides the encoded representation to the attention layer. For example, when the network input is a sequence, the encoder neural network can generate a respective encoded representation of each element in the sequence. When the network input is an image, the encoder neural network can generate a respective encoded representation of multiple spatial regions within the image or can receive an embedding of the image and generate the respective encoded representation for each of the spatial regions from the embedding. The decoder neural network generates the neural network output by querying the attention layer, i.e., by providing hidden states of certain components to the decoder neural network layer and using received attention layer outputs to generate the network output.

In this example, the area attention neural network layer can be used in place of the attention layer, with the items in the memory corresponding to the multiple portions, the keys and values both being the encoded representations, and the attention query being the query from the decoder.

As another example, some neural networks employ an attention-based architecture that are made up of multiple layers that employ multi-head attention. An example of such a neural network architecture is the Transformer architecture described in Vaswani, et al., Attention is all you need, http://arxiv.org/abs/1706.03762.

In these cases the area attention layer can be employed in place of some or all of the attention heads in the multi-head attention layers. When the area attention layer is an attention head in a self-attention layer, the queries, keys, and values are all derived from the same input, i.e., by the multi-head attention layer before being provided to the area attention layer. When the area attention layer is an attention head in an encoder-decoder attention layer, the queries are derived from the decoder input to the encoder-decoder attention layer, and the keys and values are derived from the encoded representations of the neural network input.

The subject matter described in this specification can be implemented in particular embodiments so as to realize one or more of the following advantages.

Conventional attention layers within a neural network generate attention weights for only individual items within a memory. The described area attention layer, on the other hand, also generates attention weights for areas of items, i.e., groups of multiple items within a memory. This allows the area attention layer to capture rich alignment distributions by focusing on multiple items when beneficial for processing the current input instead of being limited to focusing on a single item.

By using an area attention layer within a neural network to replace some or all of the convention attention layers in the neural network, the described systems can achieve high quality and even state-of-the-art results on a variety of tasks, e.g., machine translation and image captioning With an encoder and decoder that are area attention-based, a sequence transduction neural network can transduce sequences more accurately than existing networks that are based on convolutional layers or recurrent layers. Additionally, the use of an attention-based architecture allows the sequence transduction neural network to transduce sequences quicker, to be trained faster, or both, e.g., because the operation of the network can be more easily parallelized.

BRIEF DESCRIPTION OF THE DRAWINGS

Like reference numbers and designations in the various drawings indicate like elements.

DETAILED DESCRIPTION

This specification describes an attention mechanism that will be referred to as area attention, which is a general mechanism for a model to attend to a group of items in the memory that are structurally adjacent. In general, in this context, a memory contains a collection of individual items with a predefined, fixed granularity, e.g., a word token or an image grid. In area attention, each unit for attention calculation is an area that can contain or represent one or more than one item of the original memory. Because each of the areas can aggregate a varying number of items, in area attention, the granularity of attention is learned from training data rather than being predetermined. Area attention can be applied to both single or multi-head attention mechanisms. In multi-head attention, with each head using area attention, a model can attend to multiple areas in the memory.

Area attention can be applied by any or all of the attention layers in neural network. That is, the area attention mechanism can replace a conventional attention mechanism employed by any or all of the attention layers in a neural network.

Figure 1:
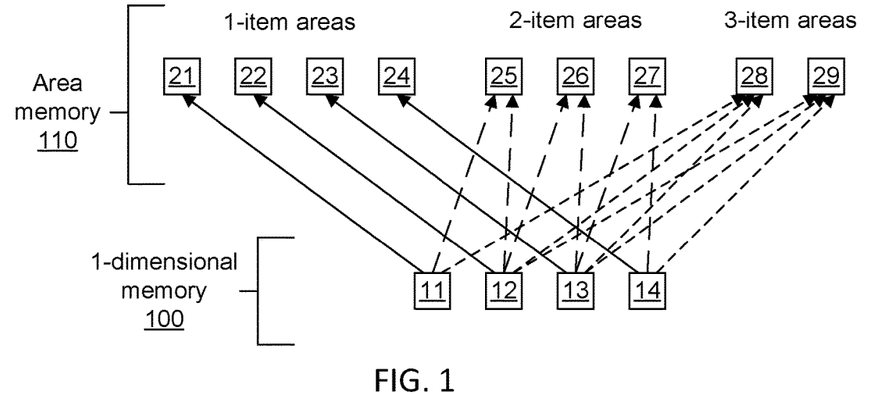
FIG. 1 illustrates example areas of attention in relation to a one-dimensional memory.

FIG. 1 illustrates example areas of attention in relation to a one-dimensional memory, i.e., a memory that contains a one-dimensional structure of items. An area is a group of structurally adjacent items in the memory, e.g., spatially for a two-dimensional memory arrangement, e.g., for images, or temporally for a one-dimensional memory arrangement, e.g., for natural language sentences. When the memory consists of a sequence of items, i.e., has a one-dimensional structure, an area is a range of items that are sequentially or temporally adjacent; and the number of items in the area can be one or more than one. Many language-related tasks, e.g., machine translation or sequence prediction tasks, fall in the one-dimensional case. FIG. 1 shows an example in which the original memory 100 is a 4-item sequence of items 11, 12, 13, 14. By combining the adjacent items in the sequence, area memory 110 is formed where each item 21-29 in the area memory is a combination of multiple adjacent items in the original memory. Items 21-24 are combinations of one item; items 25-27 are combinations of two; and items 28-29 are combinations of three. The maximum area size a system will consider for a task can be limited. In the example of FIG. 1, the maximum area size is three items.

Figure 2:
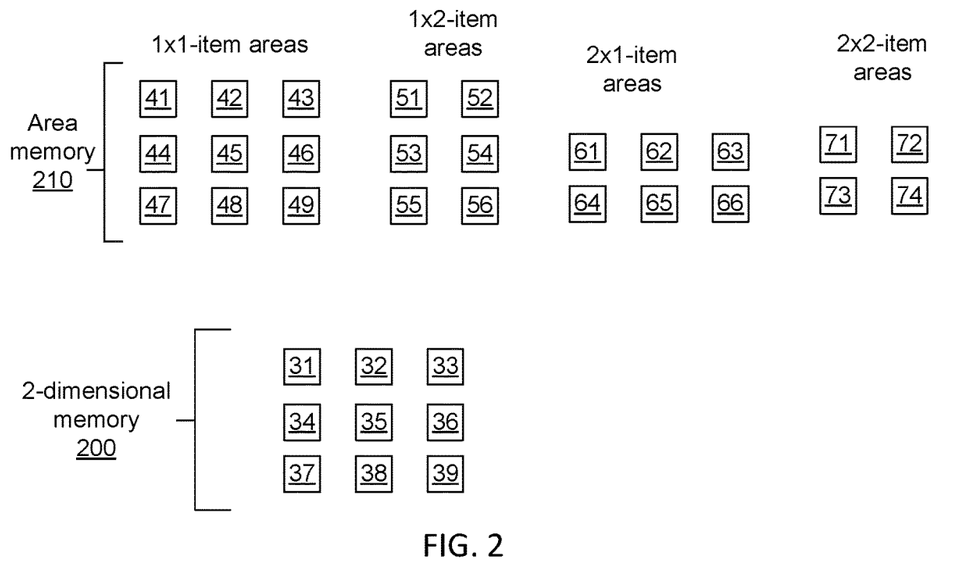
FIG. 2 illustrates example areas of attention in relation to a two-dimensional memory.

FIG. 2 illustrates example areas of attention in relation to a two-dimensional memory 200, i.e., a memory that contains a two-dimensional structure of items 31-39. When the memory contains a grid of items, a two-dimensional structure, an area can be any rectangular region in the grid. The maximum area size the system will consider for a task can be limited in the two-dimensional case as well. For a two-dimensional area, this can be done by setting the maximum height and width for each area. In the example of FIG. 2, the original memory is a 3×3 grid of items and the maximum height and width allowed for each area is two items. The area memory 210 thus contains areas of dimension 1×1 with area items 41-49; areas of dimension 1×2 with area items 51-56, each of dimension 1×2; areas of dimension 2×1 with area items 61-66, each of dimension 2×1; and areas of dimensions 2×2 with area items 71-74, each of dimension 2×2.

As particular examples, area item 47 is a 1×1 area and therefore includes only item 37, while area item 56 is a 1×2 area and includes items 33 and 36, area item 66 is a 2×1 area and includes items 38 and 39, and area item 71 is a 2×2 area and includes items 32, 33, 36, and 36.

Because the output of area attention includes attended outputs over information with varying granularity, the remaining components of the neural network can learn which levels of granularity are important for a particular task during training of the neural network system.

For a model be able to attend to each area as a unit of attention, a key and value are defined for each area that contains or represents one or multiple items in the original memory. The system can then receive an attention query and apply an attention mechanism using the area keys and values.

Figure 3:
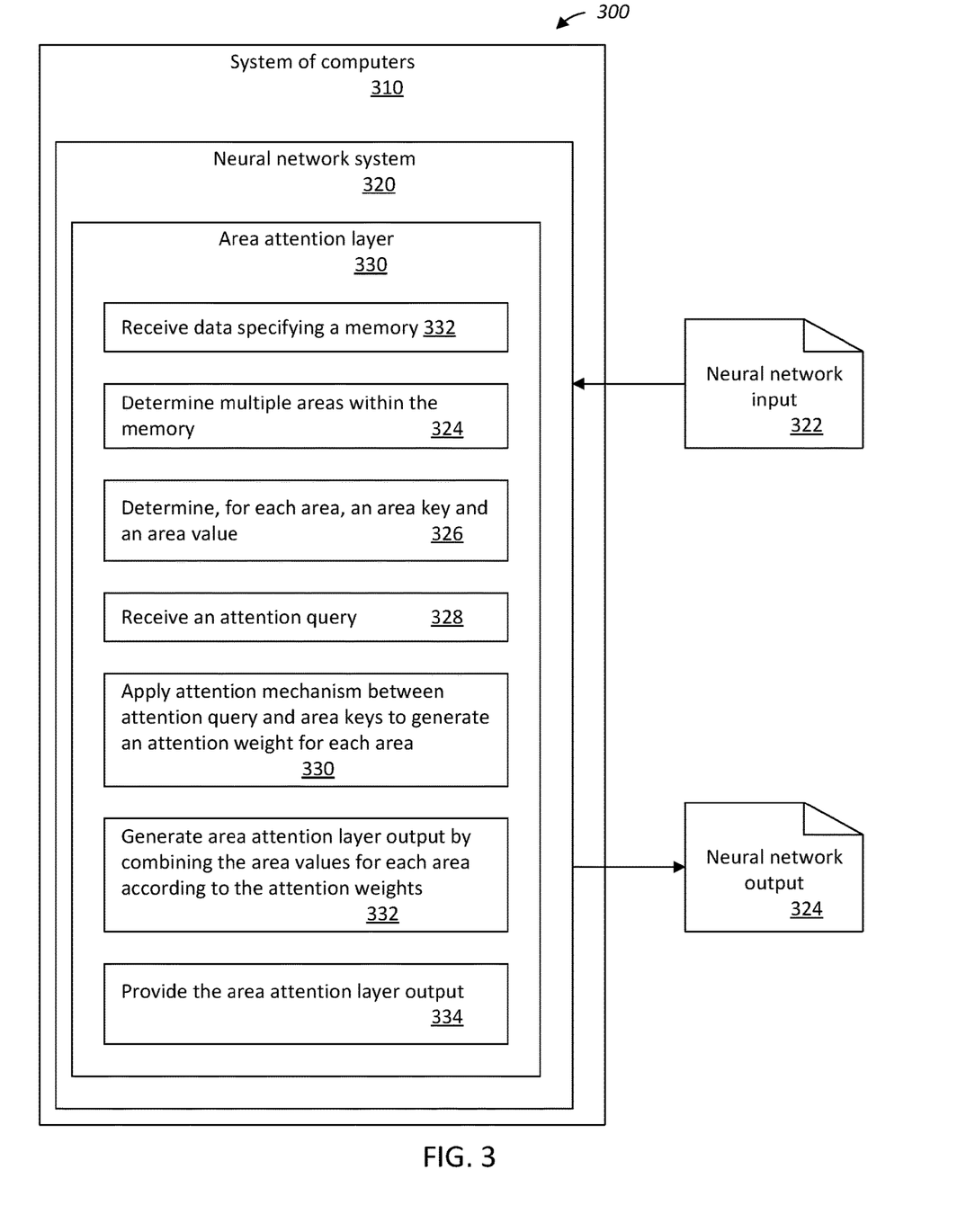
FIG. 3 illustrates a system of one or more computers implementing a neural network system with an area attention layer.

FIG. 3 illustrates a system 300 of one or more computers 310 implementing a neural network system 320 with an area attention layer 330. The neural network system is configured to receive a neural network input 322 and to generate a neural network output 324.

The area attention layer is configured to perform operations to implement area attention during the processing of the neural network input. The attention layer is configured to receive data specifying a memory 332 that contains multiple items and, for each item, a respective key and a respective value, and to determine multiple areas within the memory 324. Each area includes one or more items in the memory, and one or more of the areas include multiple adjacent items in the memory. The attention layer is further configured to determine, for each of the areas, a respective area key and a respective area value 326 from at least the keys and values of the items in the area; receive an attention query 328; apply an attention mechanism between the attention query and the area keys for each area to generate a respective attention weight for each area 330; and generate an area attention layer output 332 by combining the area values for each area in accordance with the attention weights. The area attention layer is further configured to provide the area attention layer output 334 to another component of the neural network system.

In some cases, the memory is arranged as a sequence of items, and determining multiple areas includes identifying, as different areas, each combination of adjacent items that includes no more than a maximum number of items. In other cases, the memory is arranged as a two-dimensional grid of items, and determining multiple areas includes identifying, as different areas, each rectangular region of items within the two-dimensional grid that has no more than a maximum height and no more than a maximum width. The maximums can be predetermined as hyperparameter values or determined using a hyperparameter search technique.

The area attention layer is configured to determine, for each of the areas, a respective area key and a respective area value. In some implementations, the layer does so by determining the area value to be a sum of the values of the items in the area or a mean of the keys of the items in the area, or by determining a plurality of features of the items in the area and combining the features to generate the area key of the area. This combining of features can be done by summing or concatenating the features to generate a combined feature and applying one or more learned non-linear transformations to the combined feature to generate the area key. The features that can be combined include one or more of an embedding corresponding to a number of items in the area, a mean of the keys of the items in the area, or a variance of the keys of the items in the area.

For areas that include only respective a single item from the memory, the area key and area value for the area are the key and value for the single item.

In some cases, each item corresponds to a portion of the neural network input, and the value for each memory item is an encoded representation of the neural network input.

In some implementations, other components of the neural network system provide as input to the attention layer the values and keys for the items in the memory and the attention query.

In some cases, the key is the same as the value the item in the memory. In other cases, the key and the value are different for each item in the memory.

In some implementations, the key of an area, $\mu_i$, is defined simply as the mean vector of the key of each item in the area, as expressed in equation 3.

$$\mu_i = \frac{1}{|r_i|} \sum_{j=1}^{|r_i|} k_{i,j} \qquad (3)$$

Here $|r_i|$ is the size of the area $r_i$.

In these implementations, the value of an area is defined as the sum of all value vectors of the items in the area, as expressed in equation 4.

$$v_i^{r_i} = \sum_{j=1}^{|r_i|} v_{i,j} \qquad (4)$$

With the keys and values defined, a system can use the standard way for calculating attention as described above in reference to equations 1 and 2. This basic form of area attention, expressed in equations 3 and 4, is parameter-free; that is, it does not introduce any parameters to be learned. Essentially, equation 3 and 4 use average and sum pooling over an area of vectors. It is possible to use other pooling methods, e.g., max pooling, to compute the key and value vector for each area.

Richer representations of each area can also be derived by using features other than the mean of the key vectors of the area. For example, a system can consider the standard deviation of the key vectors within each area, shown in equation 5, below.

$$\sigma_i = \sqrt{\frac{1}{|r_i|} \sum_{l=1}^{|r_i|} (k_{i,l} - \mu_i)^2} \qquad (5)$$

The system can also consider other features, e.g., the height and width of each area.

When considering these other features, the system can process the features, i.e., the mean, the standard deviation and, if used, features identifying the height and width of the area, using a multi-layer perceptron neural network that is trained jointly with the neural network system to generate the key for the area.

To efficiently compute $\mu_i$, $\sigma_i$, and $v_i^{r_i}$, a system can implement an optimization technique known as a summed area table. The summed area table is based on an integral image, I, which can be efficiently computed in a single pass of the memory. With the integral image, the system can calculate the key and value of each area in constant time.

Figure 4:
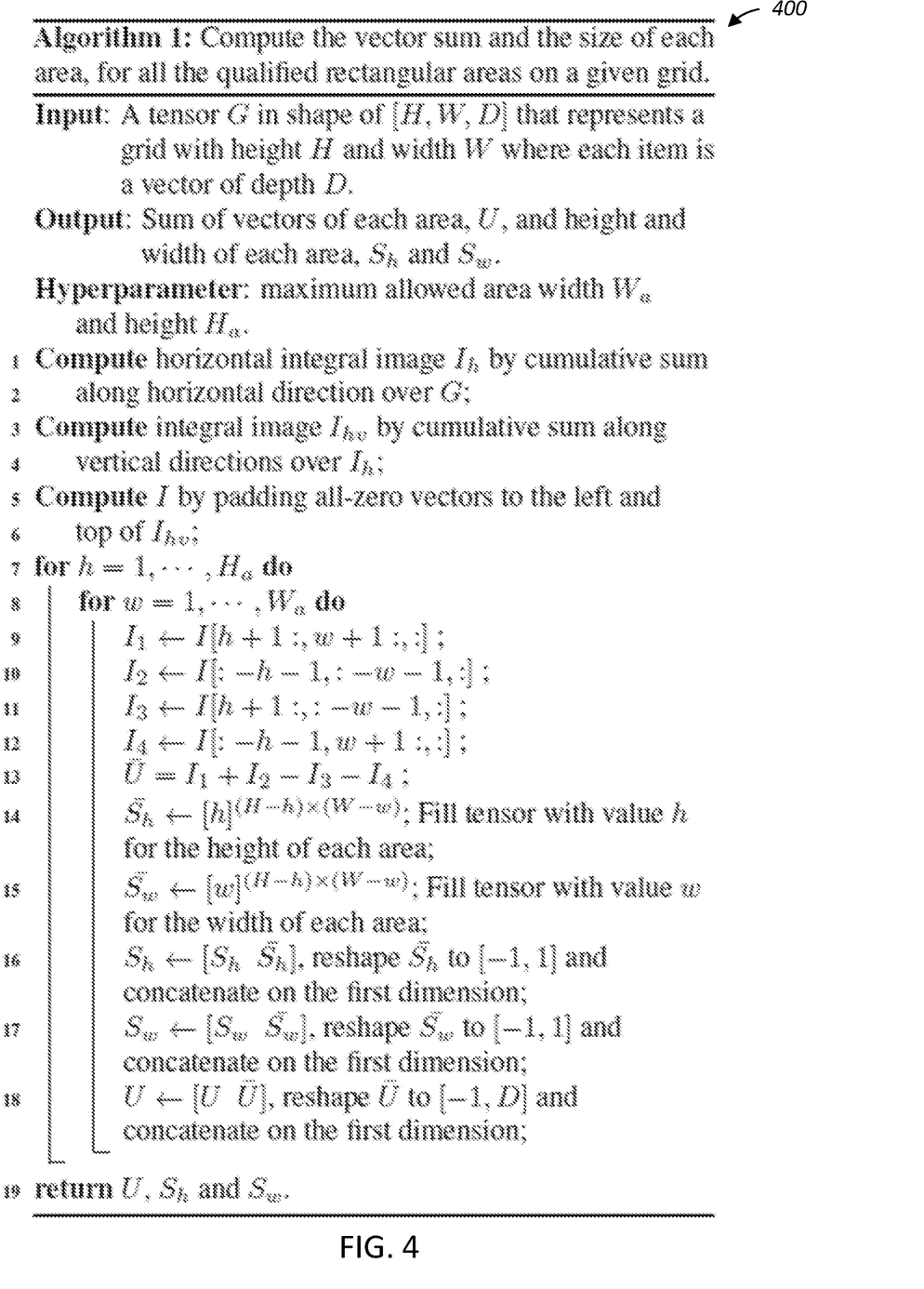
FIG. 4 and FIG. 5 show pseudocode for performing area attention calculations.
Figure 5:
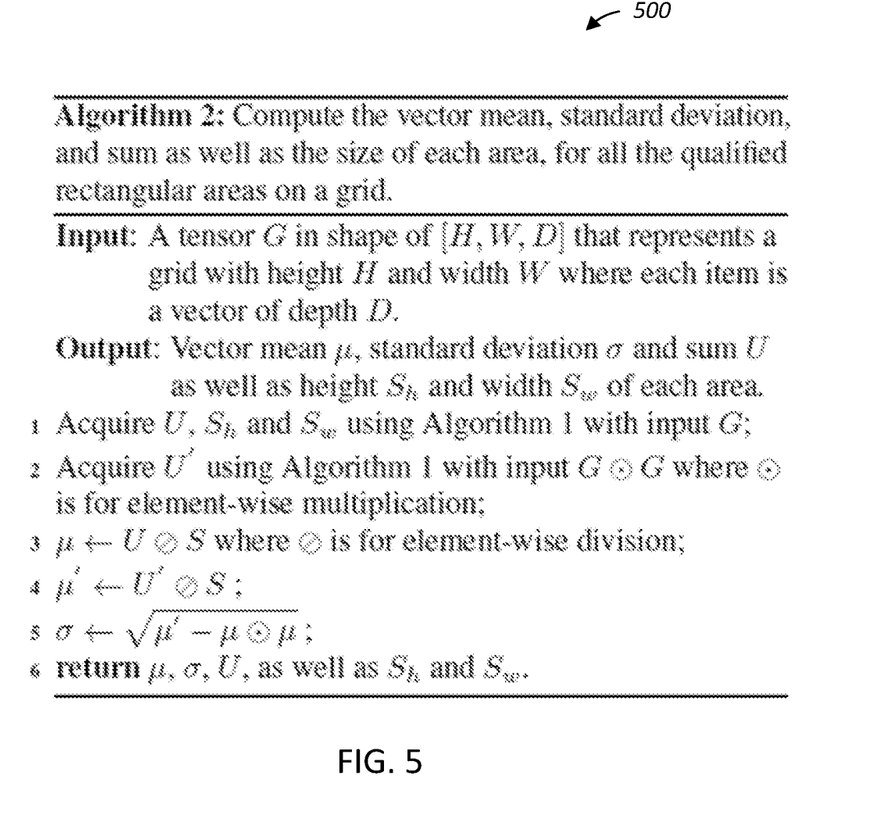

FIG. 4 and FIG. 5 show pseudocode for performing area attention calculations. In particular, they perform the calculations of equations 3, 4 and 5 for all areas that have less than the maximum size given an input memory grid as well as determine the shape size of each area. The operations in the pseudocode can be used to efficiently compute the area keys and area values for all of the areas for a given two-dimensional memory grid. The operations in the pseudocode are based on the tensor operations of the TensorFlow open-source software library.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations.

Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to implement a neural network system configured to receive a neural network input and to generate a neural network output, the neural network system comprising:
   an area attention layer, wherein the area attention layer is configured to, during processing of the neural network input:
      receive data specifying a memory comprising a set of multiple items and, for each item, a respective key and a respective value;
      determine a plurality of areas within the memory, wherein: (i) each area includes one or more items in the memory, (ii) one or more of the areas include multiple adjacent items in the memory, and (iii) the plurality of areas within the memory comprises one or more given areas that each include a respective number of items that is greater than one but less than a total number of items in the set of items;
      determine, for each of the plurality of areas, a respective area key and a respective area value from at least the keys and values of the items in the area, comprising for each of the one or more given areas;
         combining the keys for the items in the given area to generate the respective area key for the given area, wherein combining the keys comprises determining the area key based on a mean of the keys of the items in the given area; and
         combining the values for the items the given area to generate the respective area value for the given area;
      receive an attention query;
      apply an attention mechanism between the attention query and the area keys for each area of the plurality of areas to generate a respective attention weight for each area of the plurality of areas, comprising, for each of the one or more given areas;
         determining the respective attention weight for the given area based on a product between the attention query and the respective area key generated by combining the keys for the items in the given area; and
      generate an area attention layer output by combining the area values for each area of the plurality of areas in accordance with the attention weights, comprising, for each of the one or more given areas;
         combining the respective attention weight for the given area and the respective area value generated by combining the values for items in the given area.

2. The system of claim 1, wherein the area attention layer is further configured to:
   provide the area attention layer output to another component of the neural network system.

3. The system of claim 1, wherein the memory is arranged as a sequence of items, and wherein determining a plurality of areas comprises:
   identifying, as a different area, each combination of adjacent items that includes no more than a maximum number of items.

4. The system of claim 1, wherein the memory is arranged as a two-dimensional grid of items, and wherein determining a plurality of areas comprises:
   identifying, as a different area, each rectangular region of items within the two-dimensional grid that has no more than a maximum height and no more than a maximum width.

5. The system of claim 1, wherein for each of the given areas, combining the values for the items in the given area comprises:
   determining the area value for the given area to be a sum of the values of the items in the given area.

6. The system of claim 1, wherein for each of the one or more given areas, combining the keys for the items in the given area comprises:
   determining the area key for the given area to be the mean of the keys of the items in the given area.

7. The system of claim 1, wherein the area key and area value for each area that includes only a single item are the key and value for the single item.

8. The system of claim 1, wherein each item corresponds to a respective portion of the neural network input, and wherein the value for each item is an encoded representation of the respective portion of the neural network input.

9. The system of claim 1, wherein (i) the values and keys for the items in the memory and (ii) the attention query are provided as input to the area attention layer by respective other components of the neural network system.

10. The system of claim 1, wherein the key is the same as the value for each item in the memory.

11. The system of claim 1, wherein the key and the value are different for each item in the memory.

12. The system of claim 1, wherein for each of the one or more given areas, combining the keys for the items in the given area to generate the area key for the given area further comprises:
   determining a variance of the keys for the items in the given area.

13. One or more computer storage media storing instructions that, when executed by one or more computers, cause the one or more computers to implement an area attention layer configured to perform operations comprising:
   receiving data specifying a memory comprising a set of multiple of items and, for each item, a respective key and a respective value;
   determining a plurality of areas within the memory, wherein: (i) each area includes one or more items in the memory, (ii) one or more of the areas include multiple adjacent items in the memory, and (iii) the plurality of areas within the memory comprises one or more given areas that each include a respective number of items that is greater than one but less than a total number of items in the set of items;
   determining, for each of the plurality of areas, a respective area key and a respective area value from at least the keys and values of the items in the area, comprising for each of the one or more given areas;
      combining the keys for the items in the given area to generate the respective area key for the given area, wherein combining the keys comprises determining the area key based on a mean of the keys of the items in the given area; and combining the values for the items in the memory within the given area to generate the respective area value for the given area;

receiving an attention query;

applying an attention mechanism between the attention query and the area keys for each area of the plurality of areas to generate a respective attention weight for each area of the plurality of areas, comprising, for each of the one or more given areas;

determining the respective attention weight for the given area based on a product between the attention query and the respective area key generated by combining the keys for the items in the given area; and generate an area attention layer output by combining the area values for each area of the plurality of areas in accordance with the attention weights, comprising, for each of the one or more given areas;

combining the respective attention weight for the given area and the respective area value generated by combining the values for items in the given area.

14. The one or more computer storage media of claim 13, wherein the operations comprise:

providing the area attention layer output to another component of a neural network system.

15. The one or more computer storage media of claim 13, wherein the memory is arranged as a sequence of items, and wherein determining a plurality of areas comprises:

identifying, as a different area, each combination of adjacent items that includes no more than a maximum number of items.

16. A method performed by one or more computers, the method comprising:

receive data specifying a memory comprising a set of multiple items and, for each item, a respective key and a respective value;

determine a plurality of areas within the memory, wherein: (i) each area includes one or more items in the memory, (ii) one or more of the areas include items in the memory, and (iii) the plurality of areas within the memory comprises one or more given areas that each include a respective number of items that is greater than one but less than a total number of items in the set of items;

determine, for each of the plurality of areas, a respective area key and a respective area value from at least the keys and values of the items in the area, comprising for each of the one or more given areas;

combining the keys for the items in the given area to generate the respective area key for the given area, wherein combining the keys comprises determining the area key based on a mean of the keys of the items in the given area; and combining the values for the items in the given area to generate the respective area value for the given area;

receive an attention query;

apply an attention mechanism between the attention query and the area keys for each area of the plurality of areas to generate a respective attention weight for each area of the plurality of areas, comprising, for each of the one or more given areas;

determining the respective attention weight for the given area based on a product between the attention query and the respective area key generated by combining the keys for the items in the given area; and generate an area attention layer output by combining the area values for each area of the plurality of areas in accordance with the attention weights, comprising, for each of the one or more given areas;

combining the respective attention weight for the given area and the respective area value generated by combining the values for items in the given area.

17. The method of claim 16, wherein the memory is arranged as a sequence of items, and wherein determining a plurality of areas comprises:

identifying, as a different area, each combination of adjacent items that includes no more than a maximum number of items.

18. The method of claim 16, wherein the memory is arranged as a two-dimensional grid of items, and wherein determining a plurality of areas comprises:

identifying, as a different area, each rectangular region of items within the two-dimensional grid that has no more than a maximum height and no more than a maximum width.

19. The method of claim 16, further comprising providing the area attention layer output to another component of a neural network system.

20. The method of claim 16, wherein for each of the given areas, combining the values for the items in the given area comprises:

determining the area value for the given area to be a sum of the values of the items in the given area.

* * * * *